United States Patent
Bucina (10) Patent No.: US 10,578,717 B2
(45) Date of Patent: Mar. 3, 2020

(54) DIMMABLE GLASS FOR EYE SAFETY FOR LIDAR TECHNOLOGY

(71) Applicant: Honeywell International Inc., Morris Plains, NJ (US)

(72) Inventor: Miroslav Bucina, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 3 days.

(21) Appl. No.: 15/885,584

(22) Filed: Jan. 31, 2018

(65) Prior Publication Data

US 2019/0235056 A1    Aug. 1, 2019

(51) Int. Cl.

| | | |
|---|---|---|
| *G01S 7/481* | (2006.01) |
| *G01S 17/933* | (2020.01) |
| *G01S 7/497* | (2006.01) |
| *G01S 7/484* | (2006.01) |
| *B60J 3/04* | (2006.01) |
| *G01S 17/95* | (2006.01) |
| *G02F 1/17* | (2019.01) |

(52) U.S. Cl.
CPC ............... *G01S 7/4814* (2013.01); *B60J 3/04* (2013.01); *G01S 7/484* (2013.01); *G01S 7/4815* (2013.01); *G01S 7/4818* (2013.01); *G01S 7/497* (2013.01); *G01S 17/933* (2013.01); *G01S 17/95* (2013.01); *G02F 1/172* (2013.01)

(58) Field of Classification Search
CPC ....... G01S 7/4814; G01S 17/933; G02F 1/172
USPC ............... 244/129.3, 129.4, 129.5; 359/296, 359/265–275; 180/271; 296/96.19; 700/217; 701/36
See application file for complete search history.

(56) References Cited

U.S. PATENT DOCUMENTS

| | | |
|---|---|---|
| 5,724,125 A | 3/1998 | Ames |
| 6,091,335 A | 7/2000 | Breda et al. |
| 6,785,032 B1 | 8/2004 | Mere |
| 6,856,919 B1 | 2/2005 | Bastian et al. |
| 7,460,247 B1 | 12/2008 | Ackerman |
| 7,847,235 B2 | 12/2010 | Krupkin et al. |
| 7,854,505 B2 | 12/2010 | Cunningham et al. |
| 8,434,358 B2 | 5/2013 | Asahara et al. |
| 8,467,037 B2 | 6/2013 | Perrie et al. |

(Continued)

FOREIGN PATENT DOCUMENTS

| | | |
|---|---|---|
| DE | 19910667 A1 | 9/2000 |
| DE | 20313276 | 11/2004 |

(Continued)

OTHER PUBLICATIONS

Cao, Xiaodong et al, "Particle Image Velocimetry Measurement of Indoor Airflow Field: A Review of the Technologies and Applications", "Energy and Buildings", Feb. 1, 2014, pp. 367-380, vol. 69, Published in: CN.

(Continued)

*Primary Examiner* — Tuyen Tra
(74) *Attorney, Agent, or Firm* — Fogg & Powers LLC (57) ABSTRACT

An eye safety assembly for a vehicle based laser beam generating system is provided. The assembly includes at least one panel of dimmable glass that is positioned within a path of at least one laser beam generated from the laser generating system and a controller configured to control a dimming of the at least one panel of dimmable glass based at least in part on information received from vehicle systems.

19 Claims, 8 Drawing Sheets

(56) References Cited

U.S. PATENT DOCUMENTS

| | | | |
|---|---|---|---|
| 9,013,332 | B2 | 4/2015 | Meis |
| 9,086,488 | B2 | 7/2015 | Tchoryk et al. |
| 9,097,799 | B2 | 8/2015 | Inokuchi |
| 9,334,807 | B2 | 5/2016 | deGaribody |
| 9,341,642 | B1 | 5/2016 | Smith |
| 9,428,186 | B2 | 8/2016 | Breed |
| 2003/0219252 | A1 | 11/2003 | Hays |
| 2007/0097350 | A1* | 5/2007 | Halama ............... G01S 7/4811 356/4.07 |
| 2008/0048101 | A1* | 2/2008 | Romig ..................... B60J 3/04 250/221 |
| 2008/0230653 | A1 | 9/2008 | Mitchell et al. |
| 2009/0273770 | A1 | 11/2009 | Bauhahn et al. |
| 2010/0020170 | A1* | 1/2010 | Higgins-Luthman ........................ B60Q 1/1423 348/135 |
| 2011/0035149 | A1 | 2/2011 | McAndrew et al. |
| 2011/0043785 | A1 | 2/2011 | Cates et al. |
| 2011/0141471 | A1 | 6/2011 | Schlotterbeck et al. |
| 2011/0149363 | A1 | 6/2011 | Harris et al. |
| 2012/0089362 | A1 | 4/2012 | Mandle |
| 2012/0242974 | A1 | 9/2012 | LaValley et al. |
| 2013/0240672 | A1 | 9/2013 | Meis |
| 2014/0330459 | A1 | 11/2014 | Baumgardner et al. |
| 2015/0280820 | A1 | 10/2015 | Breuer et al. |
| 2015/0330310 | A1 | 11/2015 | deGaribody |

FOREIGN PATENT DOCUMENTS

| | | |
|---|---|---|
| EP | 1783513 A2 | 5/2007 |
| EP | 2076826 B1 | 11/2012 |
| JP | 2003156330 A | 5/2003 |
| KR | 100898617 B1 | 5/2009 |

OTHER PUBLICATIONS

European Patent Office, "Extended European Search Report for EP Application No. 17191995.4", "from Foreign Counterpart to U.S. Appl. No. 15/280,847", dated Nov. 27, 2017, pp. 1-11, Published in: E.P.

European Patent Office, "Partial European Search Report for EP Application No. 17191993.9", "Foreign Counterpart to U.S. Appl. No. 15/427,087", dated Jan. 19, 2018, pp. 1-16, Published in: EP.

United States Patent and Trademark Office, "Restriction Requirement for U.S. Appl. No. 15/427,087", dated Jan. 30, 2018, pp. 1-7, Published in: US.

European Patent Office, "Communication pursuant to Article 94(3) from EP Application No. 17191993.9 dated Dec. 21, 2018", from Foreign Counterpart to U.S. Appl. No. 15/427,087, Dec. 21, 2018, pp. 1-12, Published: EP.

Overbeck et al., "Airborne Lidar System Profiles Wind Fields", http://www.laserfocusworld.com/articles/print/volume-32/issue-4/world-news/airborne-lidar-system-profiles-wind-fields.html [Nov. 9, 2017], Jan. 4, 1996, pp. 1-10, Laser Focus World.

Scherbarth et al., "Eye safe Laser based DIRCM Systems", Technologies for Optical Countermeasures VI, 2009, pp. 1-10, vol. 7483, Proc. of SPIE.

U.S. Patent and Trademark Office, "Restriction Requirement", U.S. Appl. No. 15/280,847, dated Mar. 7, 2019, pp. 1-6, Published: US.

Untied States Patent and Trademark Office, "Non-Final Office Action from U.S. Appl. No. 15/427,087 dated Sep. 18, 2018", p. 1-57, Published in: US.

European Patent Office, "Office Action from EP Application No. 17191995.4", "from Foreign Counterpart to U.S. Appl. No. 15/280,847" dated Jul. 19, 2018, p. 1-4, Published in: EP.

"MAPPS", "Airborne LIDAR Survey Systems and Aviation Safety: an overview of concepts, qualifications and regulations", "prepared for Federal Aviation Administration by The Management Association for Private Photogrammetric Surveyors (MAPPS)", May 20, 2014, pp. 1-15.

European Patent Office, "Extended European Search Report from EP Application No. 17191993.9 dated Mar. 29, 2018", "from Foreign Counterpart to U.S. Appl. No. 15/427,087", dated Mar. 29, 2018, pp. 1-15, Published in: EP.

U.S. Patent and Trademark Office, "Restriction Requirement for U.S. Appl. No. 15/427,087", dated Apr. 11, 2018, pp. 1-20, Published in: US.

Garde et al, "Apparatus and Method for Laser Particle Sensor Safety", "U.S. Appl. No. 15/427,087, filed Feb. 8, 2017", dated Feb. 8, 2017, pp. 1-47.

Garde et al, "Laser Air Data Sensor Mounting and Operation for Eye Safety", "U.S. Appl. No. 15/280,847, filed Sep. 29, 2016", Dated Sep. 29, 2016, pp. 1-37.

European Patent Office, "Extended European Search Report from EP Application No. 19154333.9 dated Jul. 3, 2019", from Foreign Counterpart to U.S. Appl. No. 15/885,584, pp. 1-8, Published: EP.

U.S. Patent and Trademark Office, "Final Office Action", U.S. Appl. No. 15/427,087, dated Jul. 23, 2019, pp. 1-25, Published: US.

U.S. Patent and Trademark Office, "Office Action", U.S. Appl. No. 15/280,547, dated Aug. 21, 2019, pp. 1-60, Published: US.

U.S. Patent and Trademark Office, "Advisory Action", U.S. Appl. No. 15/427,087, dated Sep. 30, 2019, pp. 1-9, Published: US.

* cited by examiner

| Laser Power (high power) | Light Limitation by Dimmable Glass | Laser Transmission Power |
|---|---|---|
| 100% | 0% | 100% |
| 100% | 25% | 75% |
| 100% | 50% | 50% |
| 100% | 75% | 25% |
| 100% | 100% | 0% |

FIG. 3A

| Laser Power (half power) | Light Limitation by Dimmable Glass | Laser Transmission Power |
|---|---|---|
| 50% | 0% | 50% |
| 50% | 25% | 37.5% |
| 50% | 50% | 25% |
| 50% | 75% | 12.5% |
| 50% | 100% | 0% |

DIMMABLE GLASS FOR EYE SAFETY FOR LIDAR TECHNOLOGY

BACKGROUND

A Light Detection and Ranging (LiDAR) system is used to determine distances between the system and objects or ground by sending out light energy (laser beams) which may be a pulsed or a continuous wave which are reflected back to a sensor of the system. By measuring how long it takes for the signals to return, the LiDAR measures the distance to the object or ground in a hard target system or to atmospheric condition in a soft target system. The strength of LiDAR returns varies with the strength of the generated laser beam and the composition of the surface object reflecting the return. The reflective percentages are referred to as LiDAR intensity. A number of factors affect the LiDAR intensity including range, incident angle, receiver and surface composition.

Different type of LiDAR applications use different wavelength laser beams. For example, ground based systems typically use wavelengths in the 500-600 nm range while air based systems typically use wavelengths in the 1000-1600 nm ranges. The smaller wave lengths are good for detecting small objects while the larger wavelengths are good for penetrating clouds.

One safety concern with the use of LiDAR is that the light energy that is generated by the LiDAR may cause permanent damage to an eye of an individual the pulsed light energy is incident upon. Eye damage is typically damage to the retina of the eye in the form of burns. The potential to cause harm is directly proportional the strength of the pulsed light energy and the wavelength.

SUMMARY

The following summary is made by way of example and not by way of limitation. It is merely provided to aid the reader in understanding some of the aspects of the subject matter described. Embodiments provide systems and methods of reducing the energy of a LiDAR during select situations.

In one embodiment, an eye safety assembly for a vehicle based laser beam generating system is provided. The assembly includes at least one panel of dimmable glass that is positioned within a path of at least one laser beam generated from the laser generating system and a controller configured to control a dimming of the at least one panel of dimmable glass based at least in part on information received from vehicle systems.

In another example embodiment, a dimmable glass assembly for a Light Detection and Ranging (LiDAR) based system is provided. The assembly includes at least one panel of dimmable glass positioned in a path of at least one output of a laser beam generator of the LiDAR based system. The dimmable glass is configured and arranged to block a selectable percentage of the output of the laser beam generator.

In yet another embodiment, a method of selectively controlling power levels of output of a multichannel LiDAR based system is provided. The method includes selectively dimming at least one dimmable glass that is positioned in a path of at least one channel output of the multichannel LiDAR based system to selectively reduce a power output of at least one associated channel of the multichannel LiDAR based system therein allowing a single laser operating at a set power output level to supply channel outputs at different output power levels.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

LiDAR technology is starting to be used broadly in many applications in vehicle travel including in the aerospace industry. Eye safety is a critical factor for any commercial application to be able to get certification and approval for the use. Embodiments discussed herein use smart glass that is electronically dimmable to help solve some of the safety concerns. Approach and methods used in embodiments allow system architecture to implement eye safety techniques while still maximizing laser power and accuracy under normal operation such as variable flight operations in an avionic realm. The use of dimmable glass in connection with LiDAR technology with variable dim levels controls how much laser light passes through, therefore can support active control of laser light leaving the LiDAR to meet prescribed maximum permissible exposure levels, such as but not limited to, the maximum permissible exposure levels defined by Nominal Ocular Hazard Distance (NOHD) for aircraft. Embodiments, allow implementation of the eye safety schemes as described in detail below.

In embodiments where there are a plurality of laser beams being emitted by a LiDAR system, each laser beam may be individually adjusted in strength via dimmable glass. This embodiment supports more options for mounting locations of the dimmable glass on the aircraft or other vehicles. As discussed below in detail, the ability to individually control the strength of each laser beam by the use of dimmable glass, allows the laser power to be set at 100% during all flight phases in an aircraft scenario. Another advantage of using dimmable glass is that it is solid state with no mechanical part and hence it is more robust against environmental conditions. Moreover, the use of dimmable glass in aircraft has already been accepted and proven safe for use in passenger windows.

Dimmable glass embodiments may support or be combined with other systems and methods (e.g. shutter, pulse repetition frequency, variable power scheme, pulse duration or mounting location) and hence it can be used as a secondary or back up system to increase ruggedness of the LiDAR eye safety system. Moreover, embodiments decrease long term maintenance cost of the product since the LiDAR eye safety system embodiments provide a rugged system. Further embodiments enhance performance of the LiDAR systems during specific flight phases where eye safety is a consideration in avionic applications. Embodiments may be used in a variety of aerospace applications such as, but not limited to, air data and atmospheric sensors which are based on LiDAR technology in order to meet eye safety requirements. Moreover, embodiments can be applied in other types of vehicles employing laser beam generating systems such as, but not limited to, LiDAR systems.

Figure 1:
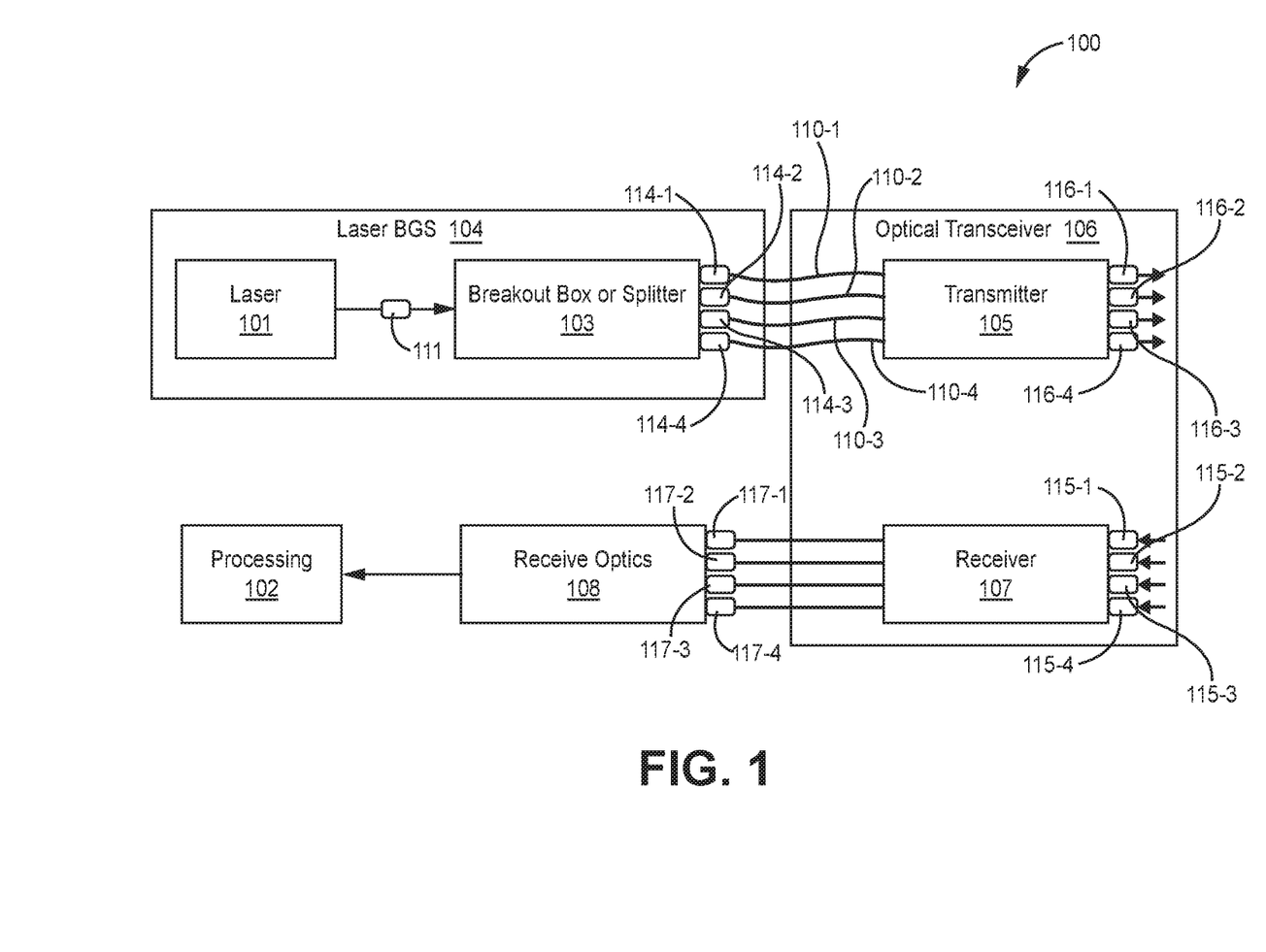
FIG. 1 is a block diagram of a LiDAR system illustrating possible locations of dimmable glass according to one exemplary embodiment.

Referring to FIG. 1, an example block diagram of a LiDAR system 100 indicating the possible location of dimmable glass in an example embodiment is provided. The LiDAR 100 of FIG. 1 includes a processing module 102 that supplies the processing for the LiDAR 100. The LiDAR 100 further includes a laser beam generating system (BGS) 104 that is used to generate laser beams. The BGS 104 is illustrated as including laser 101 and breakout box or splitter (breakout box/splitter) 103 that generates four channels of laser beams from the laser 101. One possible location of a dimmable glass 111 is in the communication path between the laser 101 and the breakout box/splitter 103. This position only requires one panel of dimmable glass 111. However, this position does not allow for individual intensity control for multiple beams as discussed below.

The generated laser beams are passed to an optical transceiver 106 via optical fibers 110-1, 110-2, 110-3 and 110-4. Another possible locations of dimmable glass 114-1, 114-2, 114-3 and 114-4, in an embodiment, is illustrated in FIG. 1 as being located at outputs of the breakout box/splitter 103. The example LiDAR system 100 includes an optical transceiver 106. The optical transceiver 106 includes a transmitter 105 and receiver 107. The transmitter 105 is designed to transmit the laser beams. Still another example location of the placement of the dimmable glass 116-1, 116-2, 116-3 and 116-4 is at the output of the transmitter 105 of the optical transceiver 106. Reflected back laser beams are received by the receiver 107 and are passed to receive optics 108. The receive optics 108 in turn, pass the received signals on to the processing module 102 for processing.

In one embodiment, dimmable glass panels 115-1, 115-2, 115-3 and 115-4 are positioned in a path of received reflected laser beams. This embodiment allows for the dimming of received input signals to the system. For example, embodiments may prevent a laser beam from being saturated by the sun. In one example, dimmable glass panels 115-1, 115-2, 115-3 and 115-4 are placed near inputs to receiver 107. Further in another example, dimmable glass panels 117-1, 117-2, 117-3 and 117-4 are placed near inputs of the receive optics 108.

Figure 2:
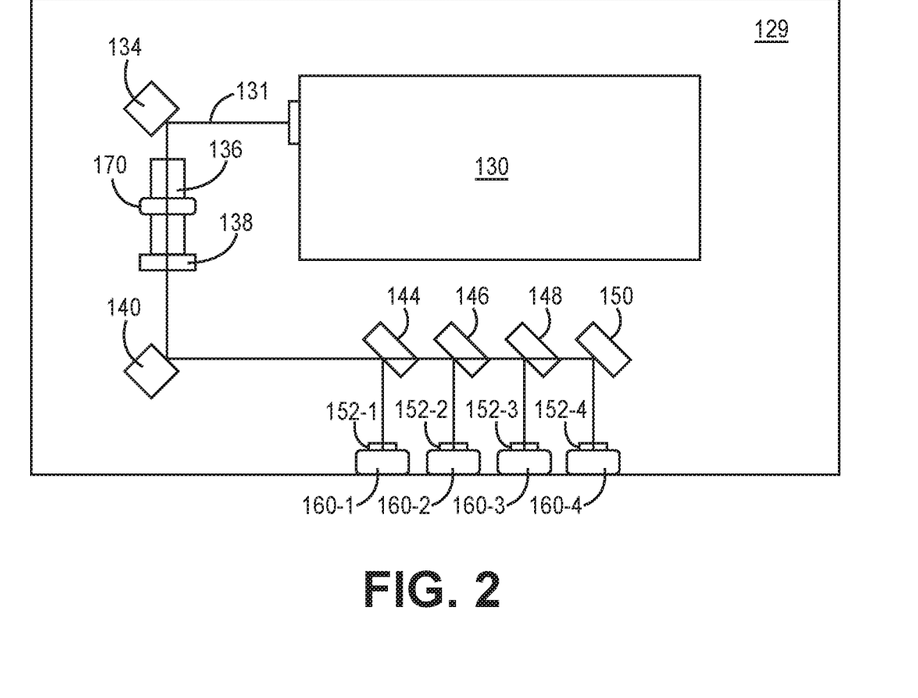
FIG. 2 illustrates a block diagram of a laser beam generating system and the possible placement of dimmable glass according to one exemplary embodiment.

FIG. 2 illustrates a block diagram of components of a laser BGS 129 of an example embodiment and the possible placement of dimmable glass within the laser BGS 129. The laser BGS 129 includes a laser 130 that generates a laser beam 131. The laser beam 131 reflects off of steering mirror 134 to a scatter shield 136 with a shutter 138. In one embodiment, a dimmable glass 170 may be positioned in the scatter shield 136 or may replace the shutter 138. If the dimmable glass 170 is positioned in these locations, the dimmable glass 170 will control the output of all the channels created by the laser BGS 104 as discussed above. Hence, the position of the dimmable glass 170 in this embodiment, controls the power level for multiple channels simultaneously.

After the scatter shield 136 with shutter 138, laser beam 131 reflects off of steering mirror 140 to beam splitters 144, 146, 148 and steering mirror 150 in this example embodiment. The split laser beams are then directed to transmit fiber outputs 152-1, 152-2, 152-3 and 152-4. In an embodiment, dimmable glass 160-1, 160-2, 160-3 and 160-4 may be positioned proximate the transmit fiber outputs 152-1, 152-2, 152-3 and 152-4. This location of the dimmable glass 160-1, 160-2, 160-3 and 160-4 provides independent control of the laser beam power leaving the laser BGS 129 for each laser beam channel. In addition, other locations are possible for the dimmable glass, hence embodiments are not limited to the example locations discussed above.

Figure 3A:
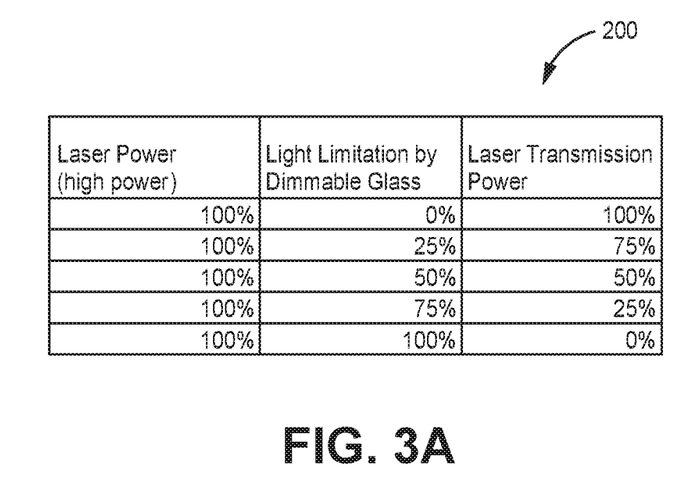
FIG. 3A illustrates a laser transmitting table of one exemplary embodiment.
Figure 3B:
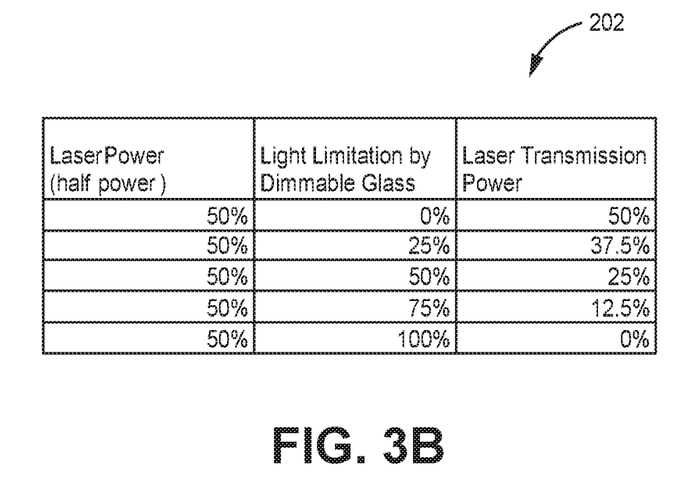
FIG. 3B illustrates another laser transmitting table of one exemplary embodiment.

FIGS. 3A and 3B illustrate example laser transmitting tables 200 and 202. Tables 200 and 202 illustrate examples of laser transmission power based on laser power and light limitation by the dimmable glass. In the table 200 example, the laser power is provided at 100 percent while various light limitation percentages are provided by dimmable glass. In the table 202 example, the laser power is provided at 50 percent while various light limitation percentages are provided by the dimmable glass. These tables illustrate that the laser power can be kept at a constant power level, in an embodiment, while still achieving a reduction in laser transmission power with the use of dimmable glass. The tables further indicate that a reduction of laser power in combination with the dimmable glass can be used to achieve a variable laser power scheme in an embodiment.

Figure 4:
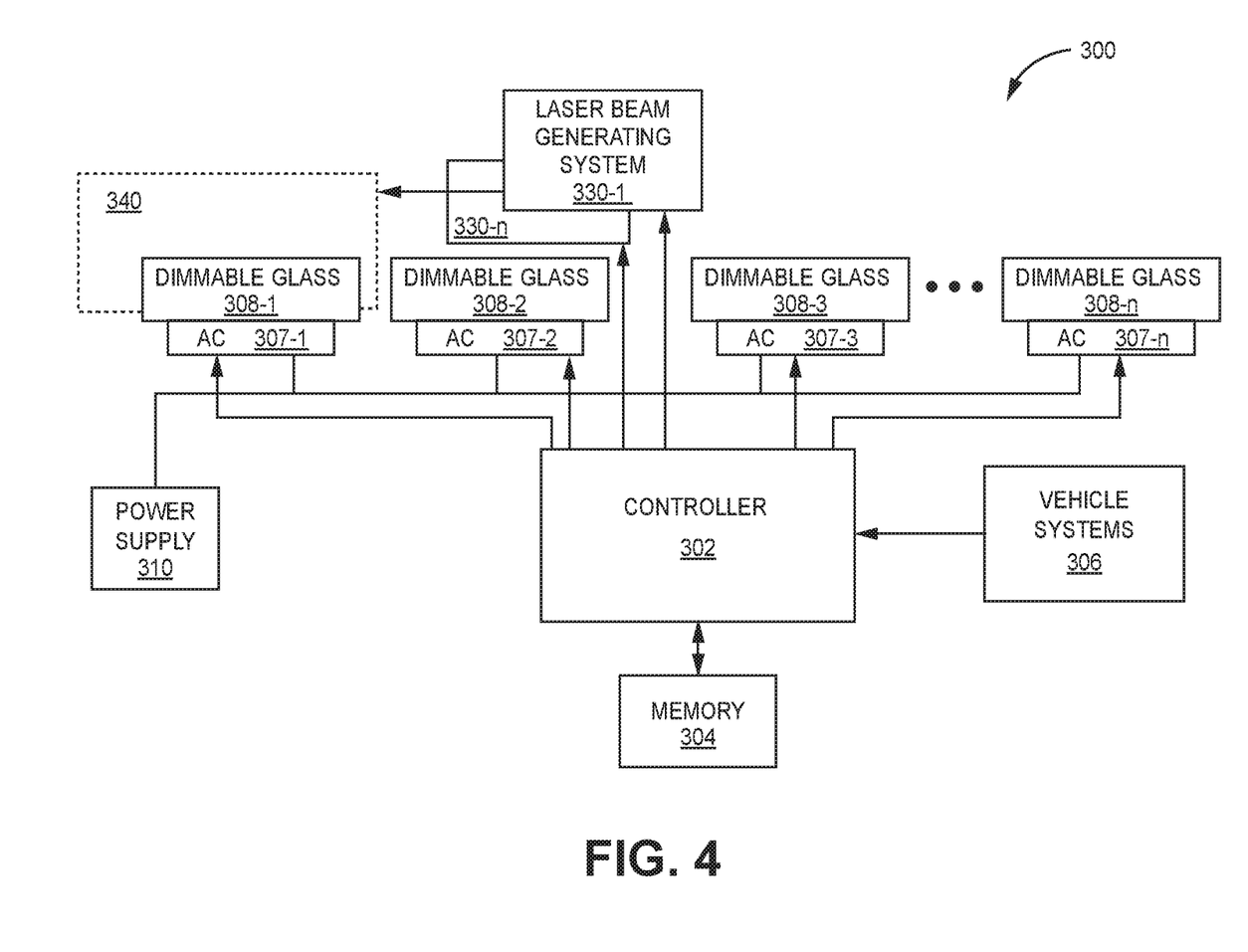
FIG. 4 is a block diagram of a dimmable glass system of one exemplary embodiment.

Referring to FIG. 4, a block diagram of a dimmable glass system 300 of an example embodiment is illustrated. This example dimmable glass system 300 includes a controller 302 to control operations of the dimmable glass system 300 and a memory to store operating instructions implemented by the controller 302. The controller 302 receives vehicle information, such as, but not limited to, vehicle location information, from vehicle systems 306. The controller 302 is in communication with activation control 307-1 through 307-$n$ associated with respective dimmable glass 308-1 through 308$n$. A power supply 310 is coupled to provide a power source for each activation control 307-1 through 307-$n$.

In general, the controller 302 may include any one or more of a processor, microprocessor, a digital signal processor (DSP), an application specific integrated circuit (ASIC), a field program gate array (FPGA), or equivalent discrete or integrated logic circuitry. In some example embodiments, controller 302 may include multiple components, such as any combination of one or more microprocessors, one or more controllers, one or more DSPs, one or more ASICs, one or more FPGAs, as well as other discrete or integrated logic circuitry. The functions attributed to the controller 302 herein may be embodied as software, firmware, hardware or any combination thereof. The controller 302 may be part of a system controller or a component controller. The memory 304 may include computer-readable operating instructions that, when executed by the controller 302 provides functions of the dimmable glass system 300. Such functions may include the functions of selectively activating each dimmable glass 308-1 through 308-n described below. The computer readable instructions may be encoded within the memory 304. Memory 304 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

One example of dimmable glass 308-1 through 308-n that may be used in embodiments is dimmable glass formed with Suspended Particle Devices (SPDs). In this type of device, a thin film laminate of rod-like nano-scale particles are suspended in a liquid and placed between to pieces of glass or plastic. The suspended particles are randomly organized, thus blocking and absorbing light when no voltage is applied. However, when voltage is applied, the suspended particles align and let light pass. As the voltage applied to the film is varied, the orientation of the particles vary thereby regulating the tint of the dimmable glass and the amount of light that passes through the dimmable glass. Other types of the dimmable glass may be used in embodiments. Hence, embodiments are not limited to a specific type of dimmable glass.

In the example of FIG. 4, the controller 302, based on information received from the vehicle systems 306 and the instructions stored in memory 304, directs each activation control 307-1 through 307-n to apply a select voltage, received from the power supply, to its associated dimmable glass 308-1 through 308-n depending on the then current situation of the vehicle to achieve a desired laser transmission power level.

Figure 5:
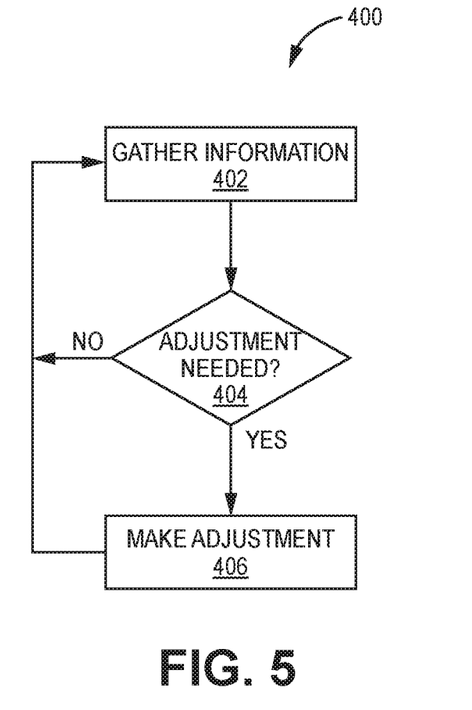
FIG. 5 is an activation flow diagram of one exemplary embodiment.

FIG. 4, further illustrates a transmitter 340 that is part of transceiver of a laser beam generating system 330-1 such as a LiDAR. At least a panel of dimmable glass 308-1 is mounted on the transmitter 340 in one embodiment. As indicated in FIG. 5, any number of dimmable glass 308-1 through 308-n (which may be panels of dimmable glass 308-1 through 308-n) can be used in embodiments. Moreover, controller 302 may be configured to control the power level of laser beams generated by the laser beam generating systems 330-1 through 330-n. Hence, as discussed above, some embodiments allow for not only the control of the dimmable glass but also for the laser beam signal strength put out by the laser generating system.

Referring to FIG. 5, an activation flow diagram 400 of an example embodiment is illustrated. The activation flow diagram is provided in a series of sequential steps. The sequence may vary in other embodiments. As illustrated in FIG. 5, in this embodiment, information regarding the vehicle is gathered in step (402). The information gathered is used to determine vehicle location information and needed laser beam strength. Hence, the information gathered may include vehicle location information, current environmental condition information, etc. from the vehicle system. From that information and the instructions stored in memory 304, the controller 302 determines if an adjustment in one or more dimmable glass 308-1 through 308-n is needed at step (404). If it is determined at step (404) an adjustment is not needed, the process continues at step (402) gathering information. If it is determined at step (404) that an adjustment is needed with one or more dimmable glass 308-1 through 308-n, the controller 302 instructs the associated activation control 307-1 through 307-n to adjust an applied voltage to its associated dimmable glass 308-1 through 308-n at step (406). Once that is complete, the process continues at step (402) gathering information.

Further embodiments provide monitoring and calibration functions. These embodiments may verify if the dimmable glass is working correctly and may allow for the adjustment of the dimmable glass to achieve a desired transmission strength. In these embodiments, reflected beams received by the receiver, such as receiver 107, in response to transmitted beams by a transmitter, such as transmitter 105, discussed above in FIG. 1 are monitored and analyzed to determine if the system is calibrated or if there is a malfunction of the system (i.e. the dimmable glass is not working). In these embodiments, at least part of the information gathered relates to reflected beams (backscatter signals) at step (402) of FIG. 5. In an embodiment this may occur in a test mode. In other embodiments it may be a continuous monitoring to assure specific beams are turned off or at least their intensity is decreased to a desired level for eye safety during select operation locations of the vehicle. Information gathered provide the ability to verify if the dimmable glass is working correctly or if one or more of the dimmable glass panels need to be adjusted or calibrated to achieve a desired signal strength. This may be part of a maintenance operation set up where a known return strength of a reflected beam is compared with a measure reflected beam. In an embodiment, if it determined that a dimmable glass needs to be calibrated, such as with step (404) of FIG. 5, the dimmable glass is adjusted at step (406) to achieve a desired calibration.

Figures 6A, 6B:
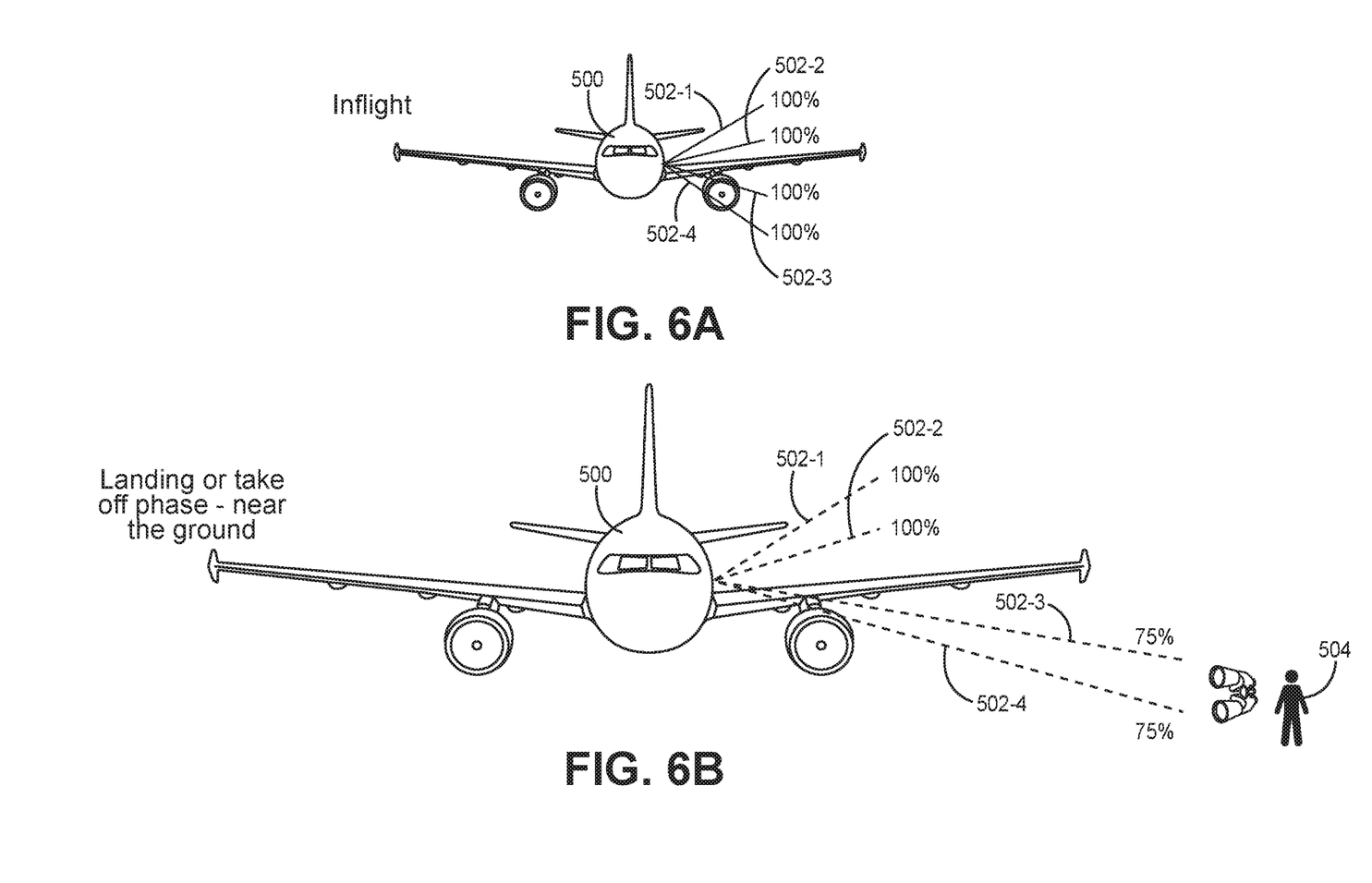
FIG. 6A is an illustration of an aircraft implementing embodiments while in flight.
FIG. 6B is an illustration of an aircraft implementing embodiments while near the ground.
Figure 6C:
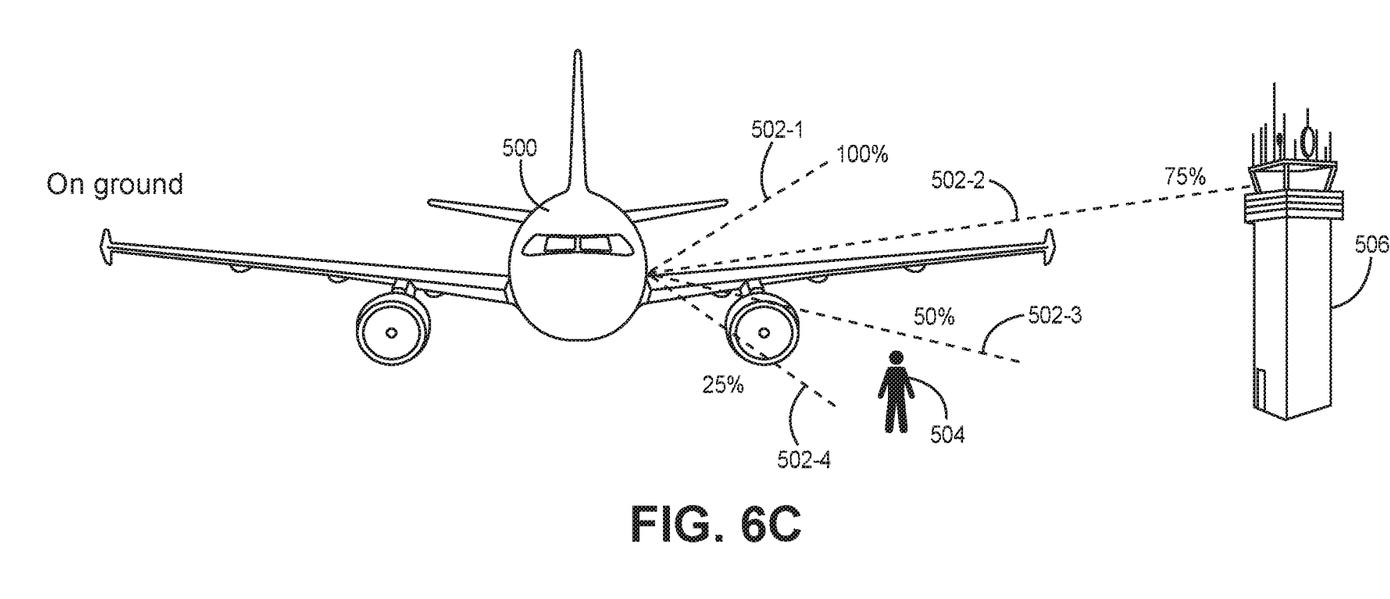
FIG. 6C is an illustration of an aircraft implementing embodiments while on the ground.

FIGS. 6A through 6C illustrate how the percentage of laser beams transmitted from an aircraft can be regulated by a dimmable glass system of an example embodiment depending on a location of the aircraft and environmental conditions. FIG. 6A illustrates an aircraft 500 in flight. In this scenario, laser beams 502-1, 502-2, 502-3 and 502-4 are transmitted by the aircraft at 100 percent. At this location it is unlikely that the laser beams would cause any harm. FIG. 6B illustrates the aircraft 500 that is landing or taking off. In this location, the aircraft 500 is close to the ground. The dimmable glass in this scenario is used to selectively reduce the laser beam power to seventy five percent for laser beams 502-3 and 503-4 directed down towards the ground where an individual 504 may be located. However, as illustrated in FIG. 6B, laser beams 502-1 and 502-2 directed away from the ground can be maintained at one hundred percent.

Further FIG. 6C illustrates the aircraft 500 on the ground. In this scenario laser beam 502-1 is maintained at one hundred percent since it is directed into the sky. Laser beam 502-2 is reduced to 75 percent since it could affect individuals in the traffic control tower 506. Further laser beam 502-3 is reduced to fifty percent and laser beam 502-4 is reduced to twenty five percent because they can affect individuals 504 on the ground. Hence, this embodiment illustrates that the laser beam intensity is reduced proportionally based on the potential closeness of possible individuals to the LiDAR in an embodiment.

Figure 6D:
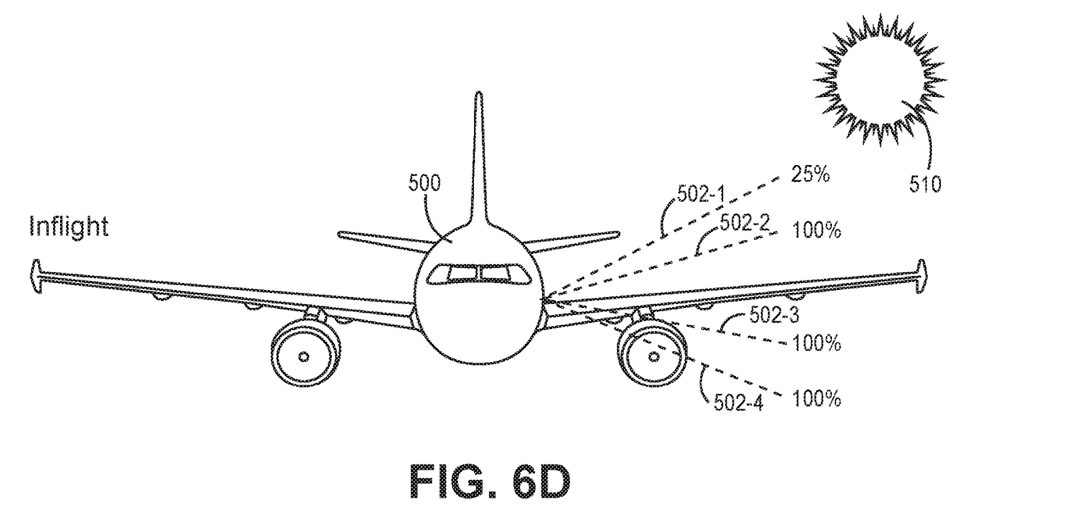
FIG. 6D is another illustration of an aircraft implementing embodiments while in flight.

A further example of implementing a dimmable glass of a dimmable glass system as the result of an environmental condition is illustrated in FIG. 6D. In the example of FIG. 6D the aircraft 500 is inflight and a channel of the laser beam is being saturated by the sun 510. In this example, a reflected laser beam 502-1 (the channel being saturated by the sun 510) is reduced to twenty five percent by a panel of dimmable glass while the remaining laser beams (other channels) 502-2, 502-3 and 502-4 are maintained at one hundred percent. In this example, the dimmable glass associated with the reflected laser beam 502-1 is dimmed to act as a variable filter for the received light of the sun 510. As discussed above in regards to FIG. 1, examples of locations of the dimmable glass to reduce laser beam intensities that is saturated by the sun 510 are dimmable glass 115-1 through 115-4 at inputs to receiver 107 and dimmable glass 117-1 through 117-4 at inputs to the receive optics 108.

Although, the application of the dimmable glass has been mainly discussed as applying to LiDAR systems in an aircraft realm, other vehicles can implement this technology and embodiments of the dimmable glass can be applied to other devices that transmit laser beams. Moreover, as discussed above, use of the dimmable glass can be used in combination with adjusting the power of the one more lasers generating the laser beams to achieve a desired laser beam power level in some embodiments. Moreover, embodiments allow the lasers used to generate the laser beams to be maintained at a hundred percent while making adjustments to the laser beam power level leaving the vehicle with the use of the dimmable glass. Further as discussed above, the dimmable glass systems may be used a secondary system or backup system having the advantage of not using mechanical parts which aids in lessening failure rates.

EXAMPLE EMBODIMENTS

Example 1 is an eye safety assembly for a vehicle based laser beam generating system. The assembly includes at least one panel of dimmable glass that is positioned within a path of at least one laser beam generated from the laser generating system and a controller configured to control a dimming of the at least one panel of dimmable glass based at least in part on information received from vehicle systems.

Example 2, includes the eye safety assembly for a vehicle based laser beam generating system of Example 1, wherein the controller is further configured to control the power level of the at least one laser beam generated by the laser beam generating system.

Example 3 includes the eye safety assembly for a vehicle based laser beam generating system of any of the Examples 1-2, wherein the information from the vehicle system relates to at least one of vehicle position and environmental conditions.

Example 4 includes the eye safety assembly for a vehicle based laser beam generating system of any of the Examples 1-3, further including a memory to store instructions implemented by the controller in the dimming of the at least one panel.

Example 5 includes the eye safety assembly for a vehicle based laser beam generating system of any of the Examples 1-4, further wherein the at least one panel of dimmable glass includes a plurality of panels of dimmable glass and the controller is further configured to independently control the dimming of each panel of dimmable glass.

Example 6 includes the eye safety assembly for a vehicle based laser beam generating system of any of the Examples 1-5, wherein the vehicle is an aircraft and the laser beam generating system is a Light Detection and Ranging (LiDAR).

Example 7 is a dimmable glass assembly for a Light Detection and Ranging (LiDAR) based system. The assembly includes at least one panel of dimmable glass positioned in a path of at least one output of a laser beam generator of the LiDAR based system. The dimmable glass is configured and arranged to block a selectable percentage of the output of the laser beam generator.

Example 8 includes the dimmable glass assembly for the LiDAR based system of Example 7, further wherein the at least one panel of dimmable glass is located in a path of at least one of an output of a breakout box, an output of a splitter, an output of a transmitter, an output of a receiver and within a scatter shield.

Example 9 includes the dimmable glass assembly for the LiDAR based system of any of the Examples 7-8, further wherein the at least one panel of dimmable glass replaces at least one shutter of the LiDAR based system.

Example 10 includes the dimmable glass assembly for the LiDAR based system of any of the Examples 7-9, further including a controller that is configured to control operation of the at least one panel of dimmable glass based at least in part on a then current location of a vehicle housing the LiDAR based system.

Example 11 includes the dimmable glass assembly for the LiDAR based system of any of the Examples 7-10, further including a controller configured to control operation of the at least one panel of dimmable glass based at least in part on environmental conditions.

Example 12 includes the dimmable glass assembly for the LiDAR based system of any of the Examples 7-11, further wherein the controller is further configured to control the power output of laser beams of the LiDAR based system.

Example 13 is a method of selectively controlling power levels of output of a multichannel LiDAR based system. The method includes selectively dimming at least one dimmable glass that is positioned in a path of at least one channel output of the multichannel LiDAR based system to selectively reduce a power output of at least one associated channel of the multichannel LiDAR based system therein allowing a single laser operating at a set power output level to supply channel outputs at different output power levels.

Example 14 includes Example 13, wherein the selectively dimming of the at least one of the dimmable glass is associated with at least one channel output that is selectively directed in an area that may be incident upon human eyes.

Example 15 includes any of the Examples 13-14, further including monitoring power levels of reflected beams; and based on the monitored power levels of the reflected beams, doing at least one of verifying desired operation of the at least one dimmable glass, calibrating the at least one dimmable glass to achieve a desired power output level and adjusting a power output of the single laser.

Example 16 includes any of the Examples 13-15, further including gathering information from vehicle systems and dimming the at least one dimmable glass when the gathered information indicates an adjustment is needed.

Example 17 includes any of the Examples 13-16, wherein the information gathered relates to a then current location of a vehicle housing the LiDAR based system.

Example 18 includes any of the Examples 13-17, wherein the information gathered relates to environmental conditions.

Example 19 includes any of the Examples 13-18, further including dimming the at least one dimmable glass and adjusting a power output level of the single laser to achieve a select power output of the at least one associated channel.

Example 20 includes any of the Examples 13-19, wherein the at least one dimmable glass includes a plurality of dimmable glass and the method includes controlling the dimming of each of the dimmable glass independently.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An eye safety assembly for a vehicle based laser beam generating system comprising:
    at least one panel of dimmable glass positioned within a path of at least one laser beam generated from the laser generating system, wherein the laser beam generating system is a Light Detection and Ranging (LiDAR);
    a transmitter configured to transmit the laser beam;
    a receiver configured to receive a reflected laser beam in response to the transmitted laser beam; and
    a controller configured to control a dimming of the at least one panel of dimmable glass based at least in part on information received from vehicle systems, the controller further configured to monitor power levels of reflected beams and based on the monitored power levels of the reflected beams, doing at least one of verifying desired operation of the at least one dimmable glass, calibrating the at least one dimmable glass to achieve a desired power output level and adjusting a power output of the LiDAR.

2. The eye safety assembly for a vehicle based laser beam generating system of claim 1, wherein the controller is further configured to control the power level of the at least one laser beam generated by the laser beam generating system.

3. The eye safety assembly for a vehicle based laser beam generating system of claim 1, wherein the information from the vehicle system relates to at least one of vehicle position and environmental conditions.

4. The eye safety assembly for a vehicle based laser beam generating system of claim 1, further comprising:
    a memory to store instructions implemented by the controller in the dimming of the at least one panel.

5. The eye safety assembly for a vehicle based laser beam generating system of claim 1, further wherein:
    the at least one panel of dimmable glass includes a plurality of panels of dimmable glass; and
    the controller further configured to independently control the dimming of each panel of dimmable glass.

6. The eye safety assembly for a vehicle based laser beam generating system of claim 1, wherein the vehicle is an aircraft.

7. A dimmable glass assembly for a Light Detection and Ranging (LiDAR) based system comprising:
    at least one panel of dimmable glass positioned in a path of at least one output of a laser beam generator of the LiDAR based system, the dimmable glass configured and arranged to block a selectable percentage of the output of the laser beam generator;
    a transmitter configured to transmit the laser beam;
    a receiver configured to receive a reflected laser beam in response to the transmitted laser beam; and
    a controller configured to monitor power levels of reflected beams and based on the monitored power levels of the reflected beams, doing at least one of verifying desired operation of the at least one dimmable glass, calibrating the at least one dimmable glass to achieve a desired power output level and adjusting a power output of the LiDAR.

8. The dimmable glass assembly for the LiDAR based system of claim 7, further wherein the at least one panel of dimmable glass is located in a path of at least one of an output of a breakout box, an output of a splitter, an output of a transmitter, an input of a receiver, an input to receive optics and within a scatter shield.

9. The dimmable glass assembly for the LiDAR based system of claim 7, further wherein the at least one panel of dimmable glass replaces at least one shutter of the LiDAR based system.

10. The dimmable glass assembly for the LiDAR based system of claim 7, further comprising:
    the controller configured to control operation of the at least one panel of dimmable glass based at least in part on a then current location of a vehicle housing the LiDAR based system.

11. The dimmable glass assembly for the LiDAR based system of claim 7, further comprising:
    the controller configured to control operation of the at least one panel of dimmable glass based at least in part on environmental conditions.

12. The dimmable glass assembly for the LiDAR based system of claim 7, further wherein the controller is further configured to control the power output of laser beams of the LiDAR based system.

13. A method of selectively controlling power level outputs of a multichannel LiDAR based system, the method comprising:
    selectively dimming at least one dimmable glass that is positioned in a path of at least one channel output of the multichannel LiDAR based system to selectively reduce a power output of at least one associated channel of the multichannel LiDAR based system therein allowing a single laser operating at a set power output level to supply channel outputs at different output power levels;
    monitoring power levels of reflected beams; and
    based on the monitored power levels of the reflected beams, doing at least one of verifying desired operation of the at least one dimmable glass, calibrating the at least one dimmable glass to achieve a desired power output level and adjusting a power output of the single laser.

14. The method of claim 13, wherein the selectively dimming of the at least one of the dimmable glass is associated with at least one channel output that is selectively directed in an area that may be incident upon human eyes.

15. The method of claim 13, further comprising:
    gathering information from vehicle systems; and
    dimming the at least one dimmable glass when the gathered information indicates an adjustment is needed.

16. The method of claim 15, wherein the information gathered relates to a then current location of a vehicle housing the LiDAR based system.

17. The method of claim 15, wherein the information gathered relates to environmental conditions.

18. The method of claim 13, further comprising:
    dimming the at least one dimmable glass and adjusting a power output level of the single laser to achieve a select power output of the at least one associated channel.

19. The method of claim 13, wherein the at least one dimmable glass includes a plurality of dimmable glass, the method comprising:

controlling the dimming of each of the dimmable glass independently.

* * * * *